United States Patent [19]

Dobson, Jr. et al.

[11] Patent Number: 5,641,728

[45] Date of Patent: Jun. 24, 1997

[54] CONTROL OF THE FLUID LOSS OF WELL DRILLING AND SERVICING FLUIDS

[75] Inventors: James W. Dobson, Jr.; Kenneth B. Mondshine, both of Houston, Tex.

[73] Assignee: Texas United Chemical Company, LLC., Houston, Tex.

[21] Appl. No.: 512,676

[22] Filed: Aug. 8, 1995

Related U.S. Application Data

[63] Continuation-in-part of Ser. No. 386,443, Feb. 19, 1995, Pat. No. 5,616,541.

[51] Int. Cl.$^6$ ..................................................... C09K 7/02
[52] U.S. Cl. ............................ 507/111; 507/113; 507/114
[58] Field of Search ................................. 507/211, 111, 507/113, 114

[56] References Cited

U.S. PATENT DOCUMENTS

| | | | |
|---|---|---|---|
| 2,929,811 | 3/1960 | Hofreiter et al. | 536/101 |
| 4,411,814 | 10/1983 | Burkhardt | 252/344 |
| 5,238,065 | 8/1993 | Mondshine | 166/300 |
| 5,504,061 | 4/1996 | Plank | 507/110 |
| 5,514,644 | 5/1996 | Dobson | 507/111 |

Primary Examiner—Sharon Gibson
Assistant Examiner—Valerie Fee
Attorney, Agent, or Firm—Roy F. House

[57] ABSTRACT

The invention provides brine based well drilling and servicing fluids containing a fluid loss control additive selected from the group consisting of (1) a crosslinked ether derivative of a partially depolymerized starch, (2) a partially depolymerized crosslinked ether derivative of starch, or (3) mixtures thereof. The fluid loss control additive provides decreased fluid losses at much lower viscosities than the corresponding starch derivatives which have not been partially depolymerized. This enables their use in fluids at concentrations sufficient to provide excellent filtration control, the fluids having a viscosity sufficient for circulation of the fluids in the borehole. The invention also provides a method of reducing the fluid loss of well drilling and servicing fluids utilizing the fluid loss control additives (1) and/or (2).

18 Claims, No Drawings

CONTROL OF THE FLUID LOSS OF WELL DRILLING AND SERVICING FLUIDS

This patent application is a continuation-in-part of patent application Ser. No. 08/386,443 filed Feb. 19, 1995 now U.S. Pat. No. 5,616,541.

BACKGROUND OF THE INVENTION

In the drilling of well bores penetrating subterranean formations, drilling fluids are generally circulated through the well bores to remove cuttings therefrom and accomplish other purposes. Most drilling fluids are comprised of suspended particles of hydrated clay in water and weighting materials such as barite are frequently combined with the drilling fluids to increase the densities thereof. Various additives are also commonly utilized in drilling fluids to impart desired properties thereto, such as to bring about low fluid loss from the drilling fluids to subterranean formations in contact therewith. However, once a well bore penetrates a subterranean formation containing desired hydrocarbon fluids, insoluble materials in the drilling fluid such as clay and barite can be damaging to the formation. That is, a filter cake or sheath of such insoluble material can form on the face of the formation and some solids of the filter cake can penetrate into the formation which in turn can result in a permanent reduction in the permeability and hydrocarbon producing ability of the formation.

In order to help prevent damage to producing formations during the drilling and completion of well bores penetrating such formations and during subsequently carried out workover procedures, brines have heretofore been utilized in lieu of drilling fluids containing insoluble solids. The brines are non-damaging because the salts contained therein which provide density to the brines are dissolved, and no solids are placed in contact with the formation thereby. Because such drilling, completion, and workover brines do not contain undissolved solids, they are commonly referred to as "clear brines."

In operations carried out in well bores penetrating subterranean formations containing fluids under high pressures, the brines utilized must have very high densities, e.g., densities in the rage of from about 9.0 to 21.5 pounds per gallon, in order to prevent the pressurized fluids from blowing out of the wellbore. These brines typically contain KCl, NaCl, CaCl$_2$, NaBr, CaBr$_2$, ZnCl$_2$, ZnBr$_2$, sodium formate and potassium formate, or combinations of such salts, and are of relatively high cost.

Because of the high cost of high density drilling, completion and workover brines, they are usually recovered, filtered, and reused in well servicing operations. The loss of such brines is expensive and certain brines are not compatible with certain formation brines causing damaging precipitation therein, and as a result, fluid loss reduction procedures and additives have heretofore been utilized with high density brines. These include increasing the viscosity of the brines by combining hydratable viscosifiers therewith such as hydroxyethylcellulose and derivatized polysaccharides. While combining such viscosifiers with high density brines has resulted in the reduction of fluid loss, the disadvantages are that relatively large quantities of the viscosifiers are required, difficulties are often encountered in dissolving and hydrating the viscosifiers in high density brines, especially brines containing zinc bromides; and the viscosity produced is often lost or greatly lessened when the brines are used in relatively high temperature or low pH environments.

U.S. Pat. Nos. 4,175,042 and 4,822,500, incorporated herein by reference for all purposes, disclose drilling, workover and completion fluids comprising a saturated brine solution in which a water soluble salt, which is not soluble in the saturated brine, of a particular size range is suspended in the saturated brine along with suitable polymeric viscosity and suspension additives and suitable fluid loss control agents. Representative saturated brines may contain one or more salts such as KCl, NaCl, CaCl$_2$, ZnCl$_2$, KBr, NaBr, CaBr$_2$, ZnBr$_2$, Na$_2$CO$_3$, K$_2$CO$_3$, and NaHCO$_3$. Representative water soluble, particulate sized salts are KCl, NaCl, CaCl$_2$, CaBr$_2$, Na$_2$SO$_4$, Na$_2$CO$_3$, K$_2$CO$_3$, and NaHCO$_3$. Representative viscosity and suspension additives are xanthan gum, cellulose ethers, and guar gum derivatives. Representative fluid loss control additives are: calcium, chrome, or ferrochrome lignosulfonates; carboxymethylcellulose; and starches such as corn, potato, and tapioca, and their derivatives. U.S. Pat. No. 4,822,500 discloses that xanthan gum and a particular epichlorohydrin crosslinked hydroxypropyl starch synergistically combine in the saturated brine to provide excellent suspension and fluid loss control. Such fluids having a saturated sodium chloride base brine have been eminently successful, and are a preferred fluid for drilling in hydrocarbon bearing formations, such as in "horizontal drilling."

The use of derivatized starch ethers in combination with bridging solids and viscosity/suspension additives, although effective in these brine fluids to reduce the fluid loss, requires a concentration that provides excessive viscosity upon exposure to higher temperatures.

SUMMARY OF THE INVENTION

We have found that low solids, brine based well drilling and servicing fluids having excellent rheological and filtration characteristics are provided by the fluids and method of this invention.

The fluids of this invention comprise a brine having dispersed therein a fluid loss control additive which comprises either (1) a crosslinked ether derivative of a partially hydrolyzed (or depolymerized) starch, or (2) a partially hydrolyzed (or depolymerized), crosslinked ether derivative of starch.

The invention also provides a method of decreasing the fluid loss of well drilling and servicing fluids which comprises adding to the fluid an effective amount of a fluid loss control additive selected from the group consisting of (1) a crosslinked ether derivative of a partially hydrolyzed starch, (2) a partially depolymerized, crosslinked ether derivative of starch, and (3) mixtures thereof.

While the invention is susceptible of various modifications and alternative forms, specific embodiments thereof will hereinafter be described in detail and shown by way of example. It should be understood, however, that it is not intended to limit the invention to the particular forms disclosed, but on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENTS

The fluid loss control additive of this invention is either (1) a crosslinked ether derivative of a partially depolymerized starch or (2) a partially depolymerized crosslinked ether derivative of starch. In the former case (1) the starch is partially depolymerized prior to crosslinking and derivatizing the starch, whereas in the latter case (2) the starch is first crosslinked and derivatized prior to partially depolymerizing the starch derivative. In either case, the molecular weight of the crosslinked starch derivative is decreased by the partial depolymerization of the starch polymer. As used throughout this specification and claims, the terms "partially depolymerized starch derivative," and "hydrolyzed starch derivative" and the like are intended to mean the starch derivatives prepared by either case (1) or case (2).

In case (1), it is preferred that the starch be hydrolyzed or depolymerized to the extent that the viscosity of an aqueous dispersion of the starch is reduced about 25% to about 92%, preferably about 50% to about 90%, prior to crosslinking and derivatizing the starch. In case (2), it is preferred that the crosslinked starch derivative be hydrolyzed or depolymerized to the extent that the viscosity of a water dispersion of the starch derivative at a concentration of 60 kg/m$^3$ is reduced about 15% to about 50%, preferably about 20% to about 40%.

Patents which disclose oxidative processes for partially depolymerizing starch derivatives and/or starches include the following, incorporated herein by reference: U.S. Pat. No. 3,975,206 (Lotzgesell et al.); U.S. Pat. No. 3,935,187 (Speakman); U.S. Pat. No. 3,655,644 (Durand). Patents which disclose acidic processes for partially depolymerizing starch derivatives and/or starches include the following, incorporated herein by reference: U.S. Pat. No. 3,175,928 (Lancaster et al.); U.S. Pat. No. 3,073,724 (Rankin et al.). An excellent source of information on the acid modification of starches is presented in "Starch: Chemistry and Technology" 2nd Edition, 1984, Roy L. Whistler, James N. Bemiller and Eugene F. Paschall, editors, Chapter XVII, pp. 529–541, "Acid-Modified Starch: Production and Uses."

Starch is a natural polymer containing an abundance of hydroxyl groups. Each anhydroglucose unit contains two secondary hydroxyls and a large majority contain primary hydroxyls. These hydroxyls potentially are able to react with any chemical capable of reacting with alcoholic hydroxyls. This would include a wide range of compounds such as acid anhydrides, organic chloro compounds, aldehydes, epoxy, ethylenic compounds, etc. When the specified chemical contains two or more moieties capable of reacting with hydroxyl groups, there is the possibility of reacting two different hydroxyls resulting in crosslinking between hydroxyls oh the same molecule or on different molecules.

The chemistry of starch and the preparation of a multitude of derivatives thereof is well known. A recent book entitled "Modified Starches: Properties and Uses," by O. B. Wurzburg, 1986 (CRC Press, Inc., Boca Raton, Fla., U.S.A.) is an excellent source for information in the preparation of starch derivatives. In regards to the preparation of the preferred crosslinked hydroxypropyl ether starches of this invention, the chapters entitled "Crosslinked Starches" and "Hydroxypropylated Starches" are particularly pertinent.

The partially depolymerized or hydrolyzed starch in case (1) or the starch in case (2) is crosslinked with a compound the molecules of which are capable of reacting with two or more hydroxyl groups. Representative crosslinking materials are epichlorohydrin and other epihalohydrins, formaldehyde, phosphorous oxychloride, trimetaphosphate, dialdehydes, vinyl sulfone, diepoxides, diisocyanates, bis (hydroxymethyl) ethylene urea, and the like. The preferred crosslinking compound is epichlorohydrin.

Crosslinking of the starch (or hydrolyzed starch) results in an increase in the molecular weight of the starch and an increase in the viscosity of aqueous dispersions of the starch.

The reaction conditions used in making crosslinked starches vary widely depending upon the specific bi-or polyfunctional reagent used for the crosslinking. In general, most of the reactions are run on aqueous suspensions of starch at temperatures ranging from room temperature up to about 50° C. Often an alkali such as sodium hydroxide is used to promote reaction. The reactions are normally run under neutral to fairly alkaline conditions, but below the level which will peptize or swell the starch. If the crosslinking reaction is run in an aqueous suspension of starch, when the desired level of crosslinking (usually as measured by some type of viscosity or rheology test) is reached, the starch suspension is neutralized and the starch is filtered and washed to remove salts, any unreacted reagent, and other impurities produced by side reactions of the crosslinking reagent with water. Konigsberg U.S. Pat. No. 2,500,950 discloses the crosslinking of starch with epoxyhalogen compounds such as epichlorohydrin.

It is preferred that the starch or hydrolyzed starch for use in the present invention be crosslinked with epichlorohydrin in a basic aqueous starch suspension at a temperature and for a period of time such that the Brabander viscosity of the suspension is within about 50% to 100% of the maximum viscosity. The viscosity will vary by the amount of crosslinking and the test conditions, i.e., temperature, concentrations, etc. A viscosity peak indicates maximum crosslinking. When the desired viscosity is reached, the crosslinking reaction is terminated. A Brabender Viscometer is a standard viscometer readily available on the open market and well known to those skilled in the art.

Generally the treatment level is from about 0.005% to 0.1% of starch to give a low degree of crosslinking of about one crosslink per 200 to 1000 anhydroglucose units. As indicated, the crosslinking may be undertaken before or after the starch is derivatized.

The epichlorohydrin crosslinked starch is then preferably reacted with propylene oxide to form the hydroxypropyl ether. The reaction of propylene oxide and starch is base catalyzed. Aqueous slurry reactions are generally catalyzed by 0.5 to 1% sodium hydroxide based on the dry weight of starch. Sodium sulfate or sodium chloride may be added to keep the starch from swelling during reaction with the propylene oxide. Reaction temperatures are generally in the 37.7° C. to 51.7° (100° to 125° F.) range. Propylene oxide levels generally range from about 1% to about 10% based on the dry weight of the starch. Propylene oxide-starch reactions take approximately 24 hours to complete under the conditions described and are about 60% efficient with respect to the propylene oxide. It is preferred that the epichlorohydrin crosslinked hydroxypropyl ether contain from about 0.5% to about 5% reacted propylene oxide based on the dry weight of starch or hydrolyzed starch.

Other methods of preparing epichlorohydrin crosslinked starches and hydroxypropyl starch ethers are well known in the art.

The preferred starch ether derivative as indicated is the hydroxypropyl ether. Other representative starch derivatives are hydroxyethyl ethers, carboxymethyl ethers, dihydroxypropyl ethers, hydroxyalkyl carboxymethyl ethers, and cationic starch ethers. The preparation of such starch derivatives is well know in the art.

The fluids of this invention comprise the fluid loss control additive of this invention dispersed in a brine (i.e., an aqueous liquid having one or more water soluble salts dissolved therein). The preferred brine contains a salt selected from the group consisting of calcium bromide, zinc bromide, calcium chloride, sodium chloride, and mixtures thereof. Such a brine may also contain other water soluble salts dissolved therein. The concentration of salts may be any concentration up to saturation in the brine. Generally the density of the brine will be from about 1200 kg/m³ to about 2400 kg/m³ (10 lbm/gal to 20 lbm/gal). As indicated hereinbefore, such brines are well known in the art. Commercially available are a calcium chloride brine having a density of 1392 kg/m³ (11.6 lbm/gal), calcium bromide brine having a density of 1704 kg/m³ (14.2 lbm/gal), a calcium bromide/zinc bromide having a density of 2304 kg/m³ (19.2 lbm/gal), and combinations of these brines with other brines or water soluble salts. Typical brines are as follows: sodium formate solutions having a density from 1200 kg/m³ to 1340 kg/m³; potassium formate solutions having a density from 1200 kg/m³ to 1600 kg/m³; $CaCl_2/CaBr_2$ solutions having a density from 1320 kg/m³ to 1812 kg/m³; $CaBr_2/ZnBr_2$ solutions having a density from 1800 kg/m³ to 2304 kg/m³; and $CaCl_2/CaBr_2/ZnBr_2$ solutions having a density from 1812 kg/m³ to 2304 kg/m³; and $CaCl_2$ solutions having a density from 1320 kg/m³ to 1404 kg/m³.

Typical concentration of the starch derivative in the brine is generally from about 8.5 kg/m³ to about 42.8 kg/m³, preferably from about 11.4 kg/m³ to about 28.5 kg/m³.

The fluids of this invention may also contain one or more viscosifiers, one or more bridging agents, and one or more alkaline buffers dispersed or suspended in the brine.

Other functional materials such as oxygen scavengers, corrosion inhibitors, and the like can be added to impart desired properties to the fluids.

The viscosifiers useful in the fluids include the water soluble polymers known and used as viscosifiers in certain brine-based fluids, such as cellulose ether derivatives and biopolymers. Representative cellulose ethers include hydroxyethyl cellulose, hydroxypropyl cellulose, dihydroxypropyl cellulose, hydroxyethyl carboxymethyl cellulose, and the like. Representative biopolymers include xanthan gum, welan gum, gellan gum, and the like. The biopolymers are preferred since they impart better suspension characteristics to the fluid at low shear rates.

As is disclosed in copending patent application Ser. No. 08/386,443 filed Feb. 10, 1995, incorporated herein by reference, an excellent viscosifier for these types of brine-based fluids is amorphous silica having an ultimate particle size less than 100 millimicrons, preferably a fumed silica. Such silica viscosifiers are commercially available and known in the art.

The bridging agents useful in this invention are well known in the art. They are solid, particulate, water soluble salts or acid soluble materials the particles of which have been sized to have a particle size distribution sufficient to seal off the pores of the formations contacted by the well drilling and servicing fluid. The bridging agent must not be appreciably soluble in the liquid used to prepare the fluid. Representative water soluble salts include sodium chloride, potassium chloride, calcium chloride, sodium formate, potassium formate, sodium bromide, potassium bromide, calcium bromide, sodium acetate, potassium acetate and the like. Representative acid soluble materials include calcium carbonate, dolomite (calcium/magnesium carbonate), iron carbonate, and other carbonates. The preferred bridging agents are sodium chloride and calcium carbonate. When using sodium chloride as the bridging agent, the brine should preferably first be saturated with sodium chloride to prevent any dissolution of the bridging agent.

The particle size distribution of the bridging agent must be sufficient to bridge across and seal the pores in the subterranean formation contacted by the fluid. Generally, as disclosed in U.S. Pat. No. 4,175,042, a preferred particle size range is from about 5 microns to about 800 microns with greater than about 5% by weight of the particles being coarser than 44 microns. It has been found, however, that the addition of a supplementary bridging agent having a particle size such that at least 90% of the particles thereof are less than 10 microns and the average particle size is from about 3 to about 5 microns decreases the fluid loss of the fluids of this invention and reduces the concentration of polymer required to impart the desired degree of fluid loss control to the fluids of this invention.

When the bridging agent is water soluble, it is preferred that the brine be saturated with respect to the bridging agent, or at least substantially saturated such that less than 10% by weight of the bridging agent is dissolved in the brine.

Optionally, but preferably, the fluids of this invention contain an alkaline buffer.

The alkaline buffer may be any alkaline particulate material having a low water solubility which will react with acids to decrease the acidity of the fluids. Representative alkaline buffers are magnesium oxide, calcium oxide, zinc oxide, calcined dolomite, magnesium hydroxide, calcium hydroxide, zinc hydroxide, hydrated dolomitic lime (calcium/magnesium hydroxide), and the like. In accordance with this invention, the fluids should exhibit pH's in the range from about 3.0 to about 8.0. Brines containing zinc bromide should have a pH less than about 6.0 as is well known in the art. Although the actual pH's of highly concentrated salt solutions cannot be accurately read using a pH meter, the relative pH's of several different highly concentrated salt solutions may be accurately compared. Thus, the measured pH's of such highly concentrated solutions become a reliable monitoring method for determining the relative acidity of the fluids involved. The measured pH's are determined with a standard pH meter, the electrode of which is inserted into the solution to be measured. As used herein, the term "measured pH" refers to pH's determined in the foregoing manner. Where it is necessary to adjust the measured pH, the adjustment may be carried out at substantially any time in accordance with this invention.

The low solids, high density fluids of this invention are useful as drilling fluids for oil and gas, particularly when drilling into hydrocarbon-containing formations, workover fluids, and completion fluids. The fluids provide excellent filtration properties providing extremely thin filter cakes. This provides more readily removable filter cakes, easier well clean-up, and better hydrocarbon production. The excellent low shear rate viscosity (rheological properties) of the fluids provide excellent suspension and hole cleaning properties.

The concentrations of the additives in the preferred fluids of this invention are as follows:

|  | Useful Concentration | | Preferred Concentration | |
| --- | --- | --- | --- | --- |
|  | kg/m³ | lbm/bbl | kg/m³ | lbm/bbl |
| Fluid Loss Control Additive | 8.5–42.8 | 3–15 | 11.4–28.5 | 4–10 |
| Viscosifier | 2.8–28.5 | 1–10 | 2.8–20.0 | 1–7 |
| Bridging Agent | 14.3–142.8 | 5–50 | 2.5–114.2 | 10–40 |
| Alkaline Buffer | 0–28.5 | 0–10 | 0–14.3 | 0–5 |

The preferred fluids of this invention are characterized as having a Low Shear Viscosity of at least 3000 centipoise, a Spurt Loss no greater than 2 cubic centimeters, and a thirty (30) minute Fluid Loss less than 10 cubic centimeters. The Low Shear Viscosity (LSV) for purposes of this invention is obtained using a Brookfield Model LVTDV-I viscometer having a number of 2 or 3 spindle at 0.3 revolutions per minute (shear rate of 0.063 sec$^{-1}$). The LSV is indicative of the suspension properties of the fluid, the larger the LSV, the better is the suspension of solids in the fluid. The Spurt Loss and Fluid Loss for purposes of this invention are obtained by a modified API filtration test. Thus to an API high temperature filtration cell with removable end cages is added a screen having 44 micron openings. There is then added 67.5 grams of a sized sand to produce a 1.5 cm sand bed. The sized sand has a particle such that all of the sand passes through a screen having 177 micron openings and is retained on a screen having 125 micron openings. The fluid to be tested is poured along the inside edge of the filtration cell so as not to disturb the sand bed. The filtration test is then conducted for 30 minutes at the desired temperature of 79.4° C. (175° F.) under a pressure differential of 17.59 kg/cm$^2$ (250 pounds per square inch) supplied by nitrogen. The spurt loss is measured as the amount of fluid expelled from the filtration cell until the flow of fluid is reduced to drops. The fluid loss is measured as the total amount of fluid collected in 30 minutes.

The fluids of this invention can be prepared by mixing together the brine, fluid loss control additive, viscosifier, bridging agent, and alkaline buffer, in any order. However, it is preferred that the fluid loss control additive be hydrated in a brine having a density less than about 1560 kg/m$^3$. Subsequently, the remaining brine having the density required to obtain a fluid having the desired density is added, followed by the viscosifier, the bridging agent, and the alkaline buffer, if used.

In order to more completely describe the invention, the following nonlimiting examples are given. In these examples and this specification, the following abbreviations may be used: API=American Petroleum Institute; FLCA= fluid loss control additive; NC=no control, complete loss of fluid; No.=number; sec.=seconds; min.=minutes; lbm/gal= pounds per U.S. gallon; bbl=42 gallon barrel; lbm/bbl= pounds per barrel; g.=grams; cc=cubic centimeters; m=meter; °C.=degrees Centigrade; Pa=pascal; %=percent by weight; kg/m$^3$=kilograms per cubic meter; Tr=Trace; PV=plastic viscosity in pascal seconds, YP=yield point in pascals; GS=second/10 minute gel strengths in pascals; LSV=Brookfield low shear viscosity at 0.3 revolutions per minute, in pascal seconds.

The plastic viscosity, yield point, and gel strengths were obtained by the procedures set forth in API's Recommended Practice 13B-1.

Various brines are used in the examples, as follows: Brine I is a 1392 kg/m$^3$ calcium chloride brine containing approximately 37.9 weight % of CaCl$_2$; Brine II is a 1524 kg/m$^3$ CaBr$_2$ brine containing approximately 42.9 weight % of CaBr$_2$; Brine III is a 1704 kg/m$^3$ calcium bromide brine containing approximately 51.9% weight % of CaBr$_2$; Brine IV is a 1620 kg/m$^3$ zinc bromide/calcium bromide containing approximately 52.8% ZnBr$_2$ and 22.8% CaBr$_2$; Brine V is a 1620 kg/m$^3$ brine containing 37.9 volume % of Brine I and 62.1 volume % of Brine III; Brine VI is a 1692 kg/m$^3$ brine containing 30.6 volume % of Brine II, and 69.4 volume % of Brine III; Brine VII is a 1752 kg/m$^3$ brine containing 45.9 volume % of Brine II, 38.8 volume % of Brine III, and 15.3 volume % of Brine IV; Brine VIII is a brine containing 32.1 volume % of Brine II and 67.9 volume % of Brine IV.

Two bridging agents have been used in the examples, as follows: Bridging Agent I is a sized, particulate sodium chloride having the particle size distribution set forth hereinbelow. Bridging Agent II is a sized calcium carbonate having the particle size distribution set forth hereinbelow.

| BRIDGING AGENTS | | | | | | |
|---|---|---|---|---|---|---|
| | Particle Size Distribution % of Particles Less Than | | | | | |
| No. | 5 μm | 10 μm | 20 μm | 30 μm | 44 μm | 74 μm |
| I | 25.4 | 39.6 | 49.6 | 79.0 | 94 | 97.6 |
| II | 30.4 | 52.0 | 72.8 | 86.4 | 95.2 | 98.4 |

The fluid loss control additives used in the examples are as follows. Fluid Loss Control Additive No. 1 is an epichlorohydrin crosslinked hydroxypropyl ether derivative of corn starch prepared by reacting epichlorohydrin in a basic suspension of waxy corn starch until the viscosity reached about 90% of the maximum attainable viscosity, and thereafter reacating the crosslinked starch with propylene oxide such that the starch derivative contained about 1.3% by weight reacted propylene oxide (See for example U.S. Pat. No. 4,822,500, incorporated herein by reference). This additive is not exemplary of the inventin and is evaluated for comparative purposes only. Fluid Loss Control Additive No. 2 is the corresponding epichlorohydrin crosslinked hydroxypropyl ether derivative of a hydrolyzed corn starch wherein the waxy corn starch was first partially hydrolyzed (depolymerized) with anhydrous hydrogen chloride gas until the Low Shear Viscosity of an aqueous slurry of the modified starch at a concentration of 120 kg/m$^3$ and a pH of 7 was decreased by 75% (i.e., the viscosity of the slurry containing the depolymerized starch was 25% of the viscosity of a slurry containing 120 kg/m$^3$ of the unmodified waxy corn starch). Fluid Loss Control Additive No. 3 is the partially hydrolyzed (depolymerized) epichlorohydrin crosslinked hydroxypropyl ether derivative of waxy corn starch, Fluid Loss Control Additive No. 1, wherein the FLCA No. 1 was treated with anhydrous hydrogen chloride gas until the Low Shear Viscosity of a water slurry of the partially depolymerized starch derivative at a concentration of 60 kg/m$^3$ and a pH of 7 was decreased by 28% (i.e., the viscosity of the slurry containing the partially depolymerized starch derivative was 72% of the viscosity of a slurry containing 60 kg/m$^3$ of the unmodified FLCA No. 1).

EXAMPLE 1

An epichlorohydrin crosslinked hydroxypropyl ether of a partially hydrolyzed corn starch was evaluated for its effect on the low shear rate viscosity and fluid loss control of Brine V as follows: 9.0 g. of FLCA No. 2 derivative was dispersed in 130 cc of Brine I; this slurry was then mixed with 213 cc of Brine III, 0.25 g MgO, and 25 g Bridging Agent II. The fluid was evaluated initially and after hot rolling at 79.4° C. for 16 hours. For comparison purposes, also evaluated was FLCA No. 1, the corresponding epichlorohydrin crosslinked hydroxypropyl ether of corn starch (non-hydrolyzed) using 9.0 g, 11.0 g and 13.0 g. The data obtained are given in Table 1.

EXAMPLE 2

The epichlorohydrin crosslinked hydroxypropyl ether of a partially hydrolyzed corn starch, FLCA No. 2 was evaluated for its effect on the low shear rate viscosity and fluid loss control of Brine VIII as follows: 7.5 g. of the FLCA No. 2 were dispersed in 105 cc. of Brine II which was saturated with respect to sodium chloride; this slurry was then mixed with 222 cc. of Brine IV which was saturated with respect to NaCl, 2.5 g. MgO, 2.5 g. hydrated lime, and 50 g. of Bridging Agent I. For comparison purposes, also evaluated was the corresponding epichlorohydrin crosslinked hydroxypropyl ether of corn starch (non-hydrolyzed), FLCA No. 1, using 3 g., 5 g., and 7.5 g. The data obtained are given in Table 2.

EXAMPLE 3

The partially depolymerized, epichlorohydrin crosslinked hydroxypropyl ether of a corn starch, FLCA No. 3, was evaluated as in Example 1 in Brine VIII, as follows: The amount of starch derivative indicated in Table 3 was dispersed in 150 cc. of Brine II; this slurry was then mixed with 50 cc. of Brine IV and 127 cc. of Brine III, followed by the concentrations of Cab-O-Sil M5 silica viscosifier and magnesium oxide set forth in Table 3, and 25 g. of Bridging Agent II. For comparison purposes, also evaluated was the corresponding epichlorohydrin crosslinked hydroxypropyl ether of corn starch (non-hydrolyzed), FLCA No. 1, using the amount of this particular starch derivative set forth in Table 3. The data obtained are given in Table 3.

TABLE 1

|  | Example 1 |  | Comparative Example 1 |  |
|---|---|---|---|---|
| Starch Derivative, kg/m$^3$ | 25.7 | 25.7 | 31.4 | 37.1 |
| Initial Properties |  |  |  |  |
| LSV, Pa · s | 0.1 | 0.2 | 0.7 | 1.2 |
| pH | 6.8 | 6.8 | 6.85 | 6.65 |
| Spurt Loss, cc | 1 | 4 | 2.5 | 2 |
| Fluid Loss, cc | 3 | 10 | 5 | 2.75 |
| Properties After hot Rolling At 79.4° C. For 16 Hours |  |  |  |  |
| LSV, Pa · s | 19.4 | 37.3 | 53.4 | 168.0 |
| pH | 6.7 | 6.65 | 6.55 | 6.5 |
| Spurt Loss, cc. | 0 | Tr. | 2.5 | 0 |
| Fluid Loss, cc. | Tr. | 3.2 | 5.5 | 0 |

TABLE 2

|  | Example 2 |  | Comparative Example 2 |  |
|---|---|---|---|---|
| Starch Derivative, kg/m$^3$ | 21.4 | 8.6 | 14.3 | 21.4 |
| Initial Properties |  |  |  |  |
| LSV, Pa · s | 2.2 | 8.1 | 11.3 | 21.0 |
| pH | 5.1 | 6.7 | 6.7 | 5.05 |
| Spurt Loss, cc | 0 | NC | 0 | 0 |
| Fluid Loss, cc | 0 | — | 2.5 | 0 |
| Properties After hot Rolling At 79.4° C. For 16 Hours |  |  |  |  |
| LSV, Pa · s | 6.8 | 24.7 | 89.5 | 141.0 |
| pH | 5.0 | 6.15 | 6.05 | 5.0 |
| Spurt Loss, cc. | 0 | — | 0 | 0 |
| Fluid Loss, cc. | 0 | — | 0 | 0 |

TABLE 3

|  | Example 3 |  | Comparative Example 3 |  |
|---|---|---|---|---|
| Starch Derivative, kg/m$^3$ | 17.3 | 25.70 | 19.99 | 25.70 |
| Silica Viscosifier, kg/m$^3$ | 5.71 | 0 | 5.71 | 5.71 |
| MgO, kg/m$^3$ | 1.43 | 1.43 | 1.43 | 1.43 |

TABLE 3-continued

|  | Example 3 |  | Comparative Example 3 |  |
|---|---|---|---|---|
| Initial Properties |  |  |  |  |
| LSV, Pa · s | 21.6 | 3.3 | 29.5 | 96.0 |
| pH | 5.9 | 5.8 | 5.7 | 5.65 |
| Spurt Loss, cc | 0 | 0 | NC | 3 |
| Fluid Loss, cc | 2 | 0 | — | 13 |
| Properties After Hot Rolling At 79.4° C. For 16 Hours |  |  |  |  |
| LSV, Pa · s | 32.0 | 2.5 | 42.0 | 196.0 |
| pH | 5.95 | 6.1 | 5.7 | 5.7 |
| Spurt Loss, cc. | 0 | 0 | NC | NC |
| Fluid Loss, cc. | 1.5 | 0 | — | — |

What is claimed is:

1. A method of reducing the fluid loss of well drilling and servicing fluids which comprises adding to the fluid an effective amount of a fluid loss control additive comprising a crosslinked ether derivative of a hydrolyzed starch wherein the starch has been hydrolyzed to the extent that the viscosity of an aqueous dispersion of the starch is about 75% to about 8% of the viscosity of an aqueous dispersion of the starch before hydrolysis.

2. The method of claim 1 wherein the hydrolyzed starch is crosslinked to the extent that the Brabender viscosity of a hydrolyzed starch suspension undergoing crosslinking is within about 50% to about 100% of the maximum viscosity which can be obtained in the suspension.

3. The method of claim 2 wherein the hydrolyzed starch is crosslinked with epichlorohydrin.

4. The method of claim 2 wherein the hydrolyzed and crosslinked starch is reacted with propylene oxide to form the hydroxypropyl ether derivative thereof.

5. The method of claim 4 wherein the hydroxypropyl ether derivative contains from about 0.5% to about 5% reacted propylene oxide.

6. The method of claim 3 wherein the hydrolyzed and epichlorohydrin crosslinked starch is reacted with propylene oxide to form the hydropropyl ether derivative thereof.

7. The method of claim 6 wherein the hydroxypropyl ether derivative contains from about 0.5% to about 5% reacted propylene oxide.

8. A method of reducing the fluid loss of well drilling and servicing fluids which comprises adding to the fluid an effective amount of a fluid loss control additive comprising a crosslinked ether derivative of starch which has been partially hydrolyzed such that the viscosity of a water dispersion of the partially hydrolyzed crosslinked ether derivative of starch at a concentration of 60 kg/m$^3$ is about 85% to about 50% of the viscosity of a water dispersion of the crosslinked ether derivative of starch.

9. The method of claim 8 wherein the starch is crosslinked to the extent that the Brabender viscosity of a hydrolyzed starch suspension undergoing crosslinking is withinin about 50% to about 100% of the maximum viscosity which can be obtained in the suspension.

10. The method of claim 9 wherein the starch is crosslinked with epichlorohydrin.

11. The method of claim 9 wherein the starch is reacted with propylene oxide to form the hydroxypropyl ether derivative thereof.

12. The method of claim 11 wherein the hydroxypropyl ether derivative contains from about 0.5% to about 5% reacted propylene oxide.

13. The method of claim 10 wherein the starch is reacted with propylene oxide to form the hydroxypropyl ether derivative thereof.

14. The method of claim 13 wherein the hydroxypropyl ether derivative contains from about 0.5% to about 5% reacted propylene oxide.

15. In a well drilling and servicing fluid which comprises a brine having dissolved therein a salt selected from the group consisting of calcium bromide, zinc bromide, calcium chloride, sodium chloride, sodium formate, potassium formate, and mixtures thereof, having a fluid loss control additive dispersed therein, the improvement which comprises using as the fluid loss control additive a crosslinked ether derivative of a hydrolyzed starch wherein the starch has been hydrolyzed to the extent that the aqueous viscosity of the starch is about 75% to about 8% of the viscosity of an aqueous dispersion of the starch before hydrolysis, wherein the hydrolyzed starch is crosslinked to the extent that the Brabender viscosity of a hydrolyzed starch suspension undergoing crosslinking is within about 50% to about 100% of the maximum viscosity which can be obtained in the suspension.

16. The fluid of claim 15 wherein the hydrolyzed starch is crosslinked with epichlorohydrin, and wherein the hydrolyzed starch is reacted with from about 0.5% to about 5% propylene oxide to form the hydroxypropyl ether derivative.

17. In a well drilling and servicing fluid which comprises a brine having dissolved therein a salt selected from the group consisting of calcium bromide, zinc bromide, calcium chloride, sodium chloride, sodium formate, potassium formate, and mixtures thereof, having a fluid loss control additive dispersed therein, the improvement which comprises using as the fluid loss control additive a crosslinked ether derivative of starch, wherein the starch has been crosslinked to the extent that the Brabender viscosity of a hydrolyzed starch suspension undergoing crosslinking is within about 50% to about 100% of the maximum viscosity which can be obtained in the suspension, which derivative has been partially depolymerized such that the viscosity of a water dispersion of the partially depolymerized crosslinked ether derivative of starch at a concentration of 60 kg/m$^3$ is about 85% to about 50% of the viscosity of a water dispersion of the crosslinked ether derivative of starch.

18. The fluid of claim 17 wherein the starch is crosslinked with epichlorohydrin and wherein the starch is reacted with from about 0.5% to about 5% propylene oxide to form the hydroxypropyl ether derivative.

* * * * *